United States Patent [19]

Williams et al.

[11] Patent Number: 5,684,455

[45] Date of Patent: Nov. 4, 1997

[54] DRIVER ALERT APPARATUS

[76] Inventors: Pete Bernard Williams; Glynis Williams, both of 134 Franklin Hgts. Dr., Murfreesboro, Tenn. 37129

[21] Appl. No.: 593,742

[22] Filed: Jan. 29, 1996

[51] Int. Cl.$^6$ .................................................. B60Q 1/00
[52] U.S. Cl. ..................... 340/439; 340/309.4; 340/457; 340/576; 180/272
[58] Field of Search .................................. 340/439, 575, 340/576, 309.15, 309.4, 457; 180/272

[56] References Cited

U.S. PATENT DOCUMENTS

| | | | |
|---|---|---|---|
| 3,611,344 | 10/1971 | Couper | 180/272 |
| 4,502,122 | 2/1985 | Yanagishima et al. | 340/575 |
| 4,564,833 | 1/1986 | Sako et al. | 340/576 |
| 4,586,032 | 4/1986 | Sako et al. | 340/576 |
| 4,679,648 | 7/1987 | Johansen | 340/575 |
| 4,879,542 | 11/1989 | Elsey | 340/575 |
| 5,012,226 | 4/1991 | Love | 340/576 |
| 5,353,013 | 10/1994 | Estrada | 340/575 |
| 5,402,108 | 3/1995 | Tabin et al. | 340/575 |

Primary Examiner—Jeffery Hofsass
Assistant Examiner—Daniel J. Wu
Attorney, Agent, or Firm—John D. Gugliotta; David L. Volk

[57] ABSTRACT

A driver alert apparatus is provided that consists of the following compoents: a green light, a yellow light and a red light lined up horizontally; alarm mechanism and speaker; electrical cord and adapters; timer; three time cycle selection buttons, placed vertically to the left of the green light; start button and stop button. The device can be positioned in an easily accessible and visible area, such as the dashboard at eye level. A time cycle is selected to be used by pressing one of the three time cycle selection buttons. The illumination of the green light is the cue for the driver, if alert, to press the sequence start button under the green light to begin the sequence again. If this button is not pressed, the yellow light will illuminate and flash three times. If the sequence start button is still not pressed, the red light will flash and sound an alarm. The alarm will be silenced only if the driver presses the alarm stop button. If the alarm stop button had to be pressed, for at least the next two minutes the system will automatically select a 15-second cycle to be sure the driver stays awake.

11 Claims, 3 Drawing Sheets

DRIVER ALERT APPARATUS

BACKGROUND OF THE INVENTION

1. Field of the Invention

The present invention relates generally to sleep prevention devices, and, more particularly, to an apparatus to maintain the alertness of an automobile driver during operation of a vehicle, thereby preventing the onset of sleepiness or drowsiness.

2. Description of the Related Art

As is well-known in the art, a number of different physical phenomena can be monitored and measured in order to detect the onset of sleep in the driver of a vehicle. Simple devices, such as foot switches which must be kept activated by a driver's foot, or electrical contacts attached to the eyelids of drivers to detect closing of the driver's eyes have proved to be ineffective due to one or more major shortcomings. Primarily, those devices which required direct physical contact with the driver tend to be awkward, uncomfortable, or inconvenient, and thereby end up ineffective due to their disuse in practice.

Another problem occurs from devices that attempt to detect driver sleepiness by monitoring indirect evidence of sleep after drowsiness has occurred.

Numerous attempts have been made to correct for the foregoing problems. For instance, U.S. Pat. No. 5,402,108, issued in the name of Tabin et al. discloses a driver alerting system which plugs into a vehicle cigarette lighter and, after actuation of a reset button, triggers a flashing red warning light after a random period of time. In accordance with the Tabin et al. disclosure, if a user does not actuate the reset button within a predetermined time after the light begins flashing, a horn will sound.

Also, in U.S. Pat. No. 5,353,013, issued in the name of Estrada, a vehicle operator sleep alarm is disclosed. However, such a device monitors driver head position and can only detect drowsiness after the onset of sleep.

Again, in U.S. Pat. No. 4,564,833 and U.S. Pat. No. 4,586,032, both issued in the name of Seko et al., a dozing warning system for a vehicle is disclosed in each. In both Seko et al. references, a device is disclosed which provides pulses indicative of the steering angle and steering direction, and monitors such pulses for comparison in order to determine that a driver is sleeping. Once again, the Seko et al. references can only detect drowsiness after the onset of sleep.

Consequently, a need has been felt for providing an apparatus which can keep the driver of an automobile awake and alert continuously while operating a vehicle.

SUMMARY OF THE INVENTION

It is therefore an object of the present invention to provide an improved driver alert apparatus.

It is a further object of the present invention to provide an improved driver alert apparatus that may be easily positioned within easy reach of any driver or within any vehicle.

It is a feature of the present invention to provide an improved sleep detection and driver alert apparatus that utilizes both visual and audible signals to stimulate the senses of a drowsy driver.

Briefly described according to one embodiment of the present invention, a driver alert apparatus is provided that consists of the following components: a green light, a yellow light and a red light lined up horizontally; alarm mechanism and speaker; electrical cord and adapters; timer; three time cycle selection buttons, placed vertically to the left of the green light; start button and stop button. To use the present invention, it is first connected to a power source in the vehicle, preferably to the main battery so that it is automatically turned on when the engine is running. The device can be positioned in an easily accessible and visible area, such as the dashboard at eye level. A time cycle is selected to be used by pressing one of the three time cycle selection buttons. If the first time cycle selection button is selected, for example, the green light will illuminate after seven minutes and flash three times. This is the cue for the driver, if alert, to press the sequence start button under the green light to begin the sequence again. If this button is not pressed, the yellow light will illuminate and flash three times. If the sequence start button is still not pressed, the red light will flash and sound an alarm. The alarm will be silenced only if the driver presses the alarm stop button. If the alarm stop button had to be pressed, the system will automatically select a 15-second cycle to be sure the driver stays awake.

An advantage of the present invention is that a driver must actively prevent the alarm from sounding, which thereby will help a driver to stay alert and awake.

Another advantage of the present invention is that both visual and audible signals are utilized to stimulate a driver.

Yet another advantage of the present invention is its utilization of selectable time intervals, which gives the driver freedom to anticipate fatigue.

Further, the reflex controls incorporated in the present invention may prevent intoxicated people from operating a motor vehicle.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
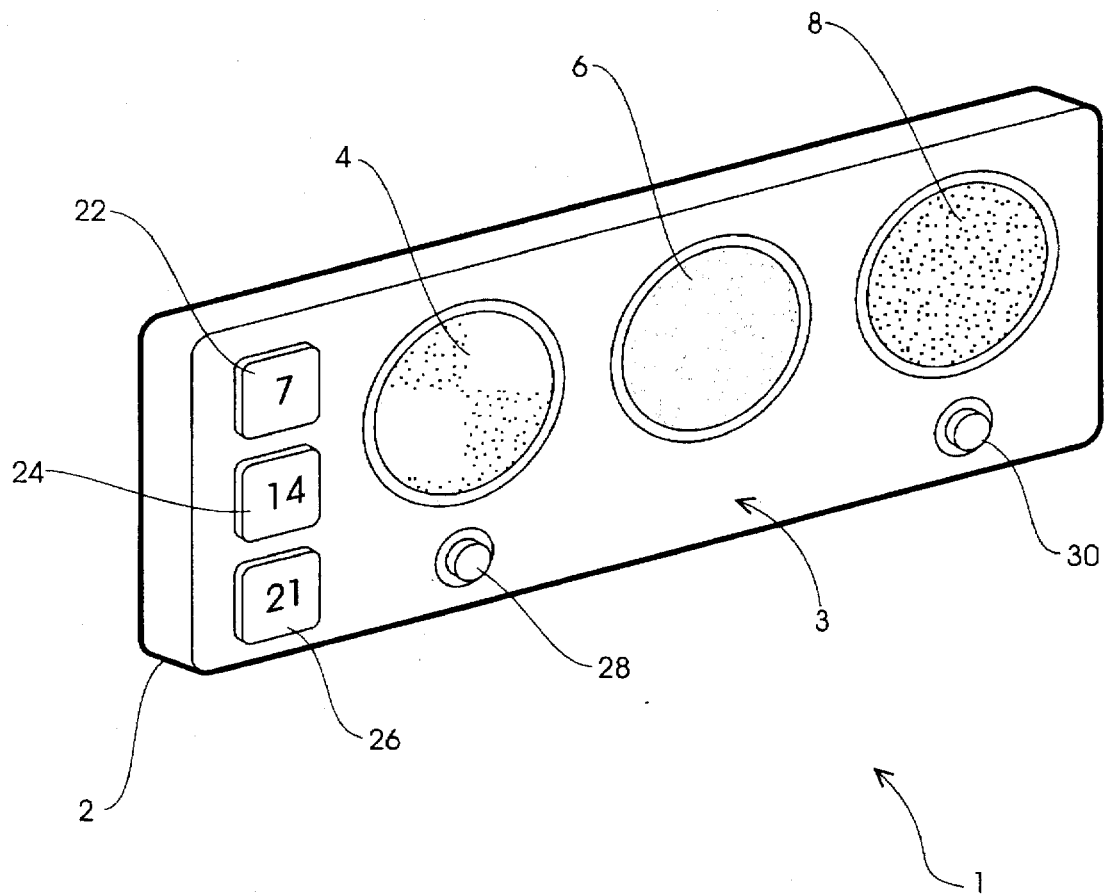
FIG. 1 is an orthographic view of a sleep detection and driver alert apparatus according to the preferred embodiment of the present invention.

Referring now to FIG. 1, a driver alert apparatus 1 is shown, according to the present invention, wherein a portable housing 2 contains a green light 4, a yellow light 6 and a red light 8. All three lights, 4,6,8, aligned horizontally across the front face 3 of the housing 2. An alarm mechanism, consisting of readily available conventional timers, integrated circuit counters or the like, are housed within the housing 2. It is currently envisioned that a conventional speaker provides an audible alarm means, and a conventional electrical cord and auto-lighter adapters provide a power source. In addition, a first time cycle sequence button 22, a second time cycle sequence button 24, and a third time cycle sequence button 26 are mounted on the front face 3 and are placed vertically to the left of the green light 4. Also, a sequence start button 28 and an alarm stop button 30 are also accessible and engagable from the front face 3.

2. Operation of the Preferred Embodiment

Figure 2:
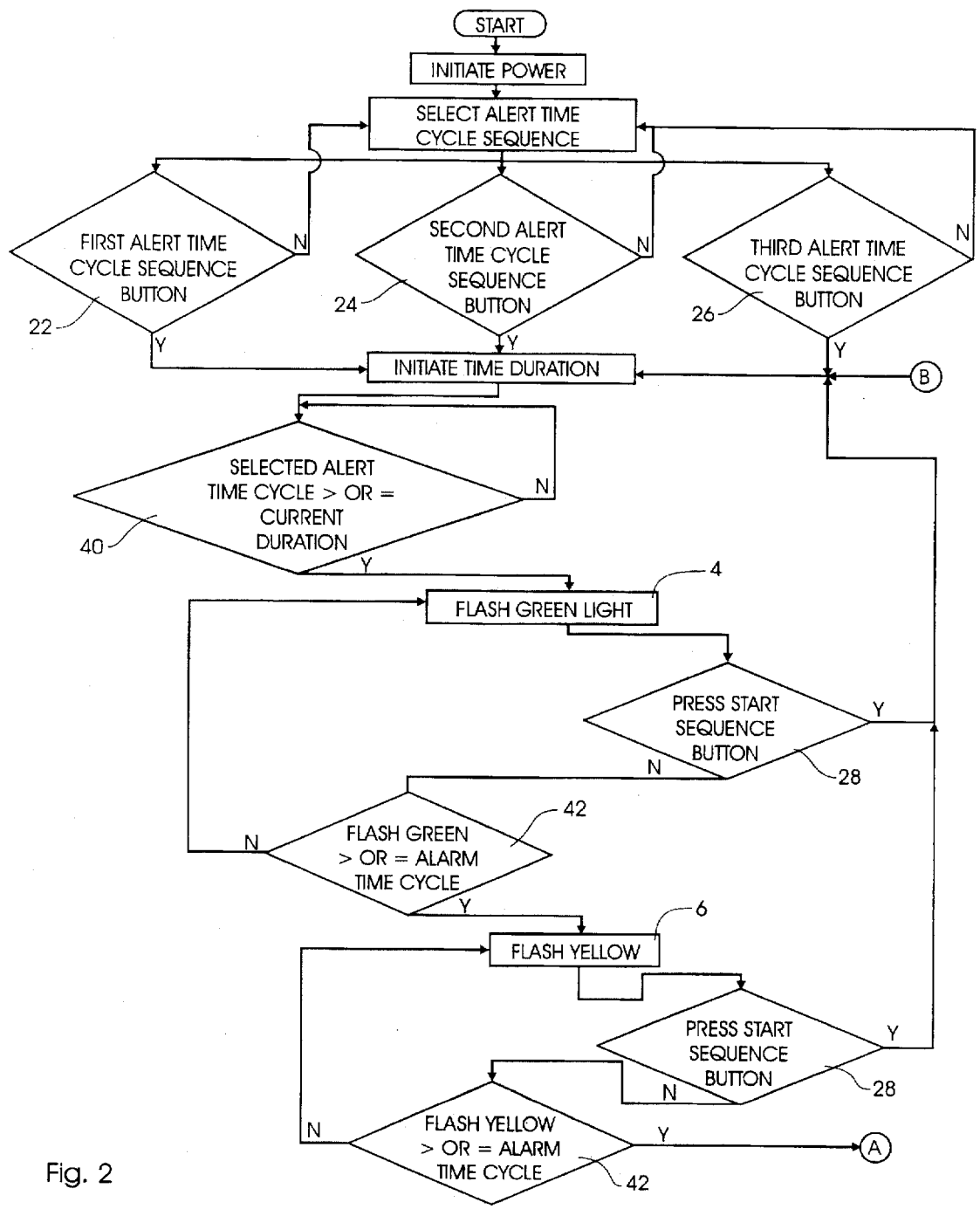
FIGS. 2 and 3 are block diagrams of the operating logic sequence for the sleep detection and driver alert apparatus depicted in FIG. 1.
Figure 3:
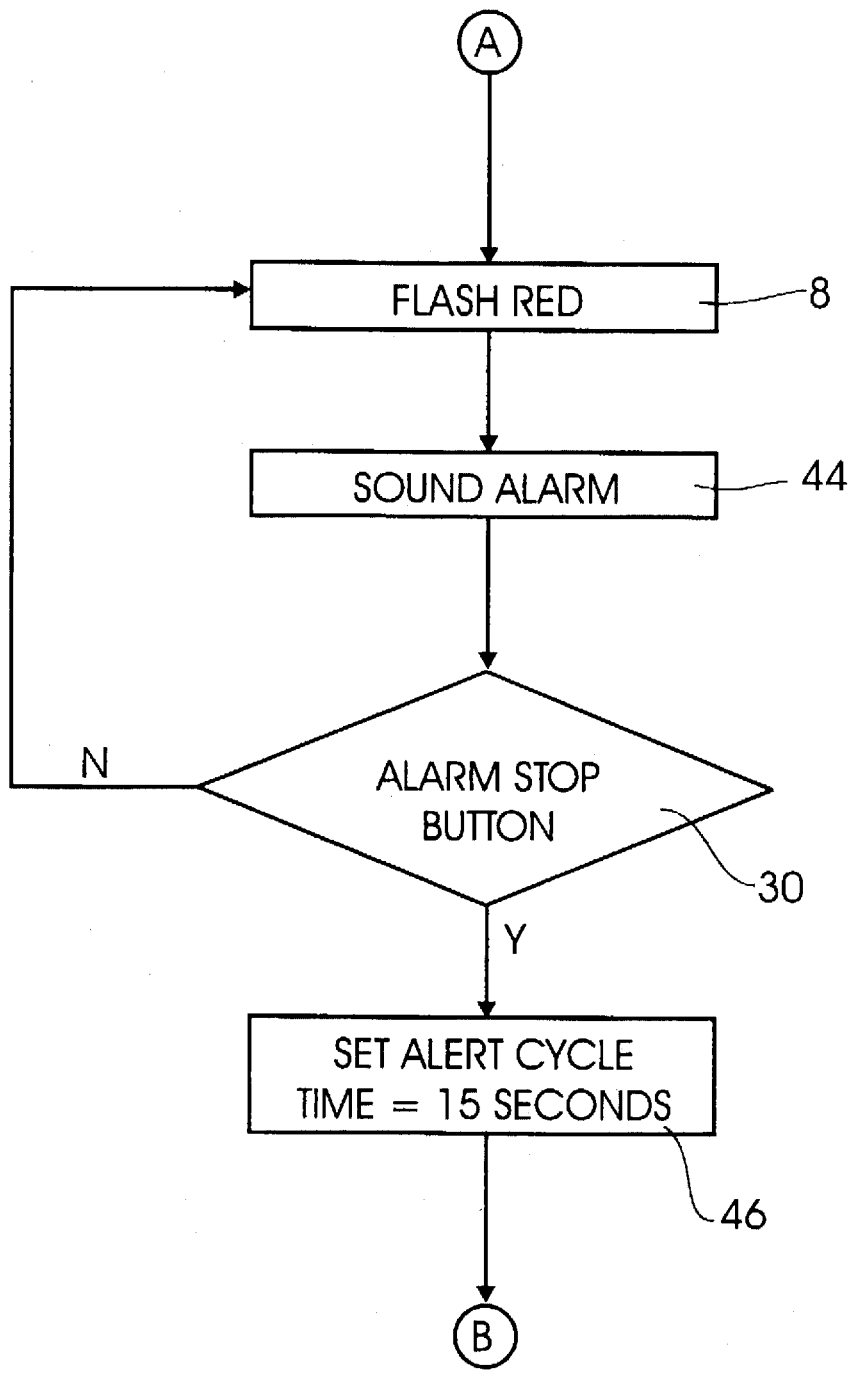

As described most thoroughly in FIG. 2, to use the present invention it is first connected to a power source in the vehicle, preferably to the main battery so that it is automatically turned on when the engine is running. The driver alert apparatus 1 can be positioned in an easily accessible and visible area, such as the dashboard at eye level. A time cycle is selected to be used by pressing one of the time cycle sequence buttons, 22, 24 or 26. An alert time comparator 40, envisioned as a conventional integrated circuit counter, will compare the appropriate time cycle selection with a current time duration. In its preferred embodiment, it is envisioned that the first time cycle sequence button 22 will initiate a 7 minute time cycle, the second time cycle sequence button 24 will initiate a 14 minute time cycle, and the third time cycle sequence button 26 will initiate a 21 minute time cycle, although other time intervals can be selected accordingly. If the first time cycle sequence button 22 is selected, for example, the green light 4 will illuminate after seven minutes and flash three times. This is the cue for the driver, if alert, to press the sequence start button 28, located under the green light 4, in order to begin the sequence again. If this sequence start button 28 is not pressed, an alarm time comparator 42, also envisioned as an integrated circuit counter, will illuminate and flash three times the yellow light 6. If the sequence start button 28 is still not pressed, the red light 8 will flash and sound an audible alarm 44. The alarm 44 will be silenced only if the driver presses the alarm stop button 30, located beneath the red light. If the alarm stop button 30 had to be pressed, the system will automatically initiate a default cycle timer, set to a relatively short duration such as 15-seconds, to be certain the driver stays awake and alert.

The foregoing description is included to illustrate the operation of the preferred embodiment and is not meant to limit the scope of the invention. From the foregoing description, many variations will be apparent to those skilled in the art that would yet be encompassed by the spirit and scope of the invention. The scope of the invention is to be limited only by the following claims.

What is claimed is:

1. A driver alert apparatus for sensing sleep or drowsiness in a driver of a motor vehicle or the like and alerting said driver, said apparatus comprising:

a portable housing having a front face;

a green light mounted visibly to said front face for a sequence start button accessible and engagable from said front face for engaging or reengaging a selected time cycle;

an alert time comparator in communication with said sequence start button for comparing any selected time duration with a current time duration and for energizing and illuminating said green light based upon such comparison;

an alarm time comparator in communication with said sequence start button and for comparing said alarm time comparator with the status of said sequence start button, said alarm time comparator also for energizing and illuminating said yellow light or said red light based upon such comparison;

an audible alarm in communication with said red light for providing an audible signal in conjunction with the illumination of said red light; and an alarm stop button in communication with both said alarm time comparator and a default cycle timer, said alarm stop button for de-energizing said red light and for resetting said alert time comparator.

2. The driver alert apparatus as described in claim 1, wherein said alert time comparator comprises a conventional integrated circuit counter.

3. The driver alert apparatus as described in claim 1, wherein said alarm time comparator comprises a conventional integrated circuit counter.

4. The driver alert apparatus as described in claim 1, wherein said first time duration is 7 minutes.

5. The driver alert apparatus as described in claim 4, wherein said second time duration is 14 minutes.

6. The driver alert apparatus as described in claim 5, wherein said third time duration is 21 minutes.

7. A method for maintaining alertness in the driver of a motor vehicle, said method comprises the steps of:

a. initiating a visual alert at a first selected interval, said first selected interval being one of three predetermined time intervals;

b. prompting said driver to acknowledge said visual alert after the expiration of said first selected interval;

c. repeating step a. and step b. until said visual alert is maintained unacknowledged;

d. initiating a first visual alarm;

e. prompting said driver to acknowledge said first visual alarm until said first visual alarm is maintained unacknowledged;

f. initiating a second visual alarm in conjunction with an